May 3, 1932. G. E. GIBBONEY 1,856,830
HOSE DARNING CLAMPING RING
Filed Dec. 2, 1929
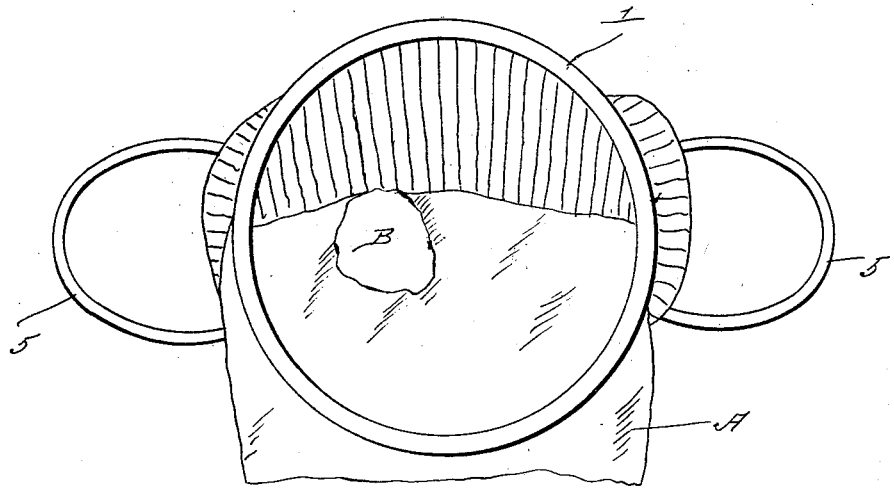
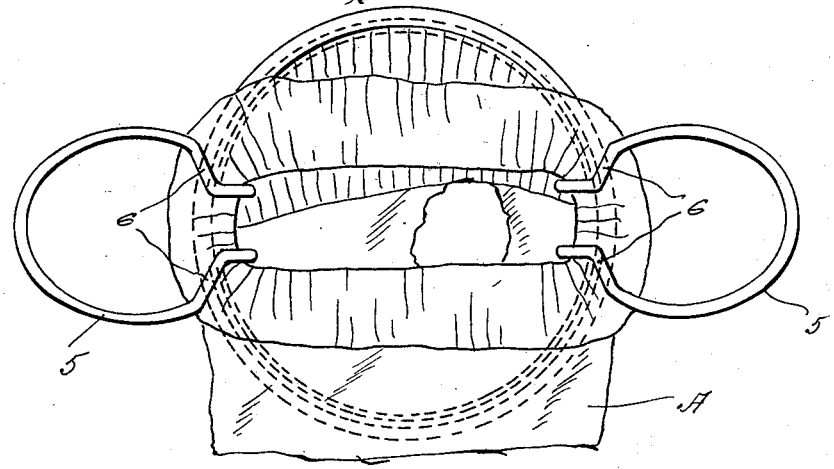
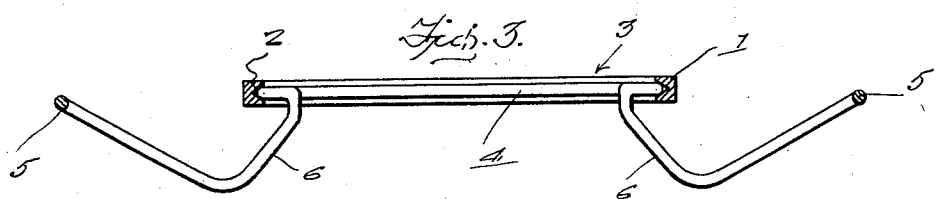
Inventor
Grace E. Gibboney
By Clarence A. O'Brien
Attorney Patented May 3, 1932

1,856,830

UNITED STATES PATENT OFFICE

GRACE E. GIBBONEY, OF SEATTLE, WASHINGTON

HOSE DARNING CLAMPING RING

Application filed December 2, 1929. Serial No. 411,077.

This invention relates to a hose darning clamping ring and has for one of its objects to provide a device of this character having co-acting means for securely maintaining the portion of the hose adjacent the hole to be darned in a stretched or tensioned condition while the darning operation is being performed.

Another important object of the invention is to provide, in a manner as hereinafter set forth, a hose darning clamping ring of the character described which is adapted for use in connection with a conventional sewing machine and which embodies means for preventing the hose from interfering with the darning operation.

Other objects of the invention are to provide a hose darning clamping ring which will be simple in construction, strong, durable, efficient in its use and which may be manufactured at low cost.

Other objects and advantages of the invention will become apparent from a study of the following specification, taken in connection with the accompanying drawings, wherein like characters of reference designate corresponding parts throughout the several views, and wherein:—

Figure 1 is a top plan view of a clamping ring constructed in accordance with this invention, the same being shown with a stocking to be mended in position therein.

Figure 2 is a view in bottom plan of the device.

Figure 3 is a longitudinal sectional view thereof.

Referring to the drawings in detail, the reference character 1 designates a rigid annulus of any suitable material such as metal and on the inner periphery of which is provided a circumferentially extending substantially V-shaped groove or channel 2. A clamping ring 3 is adapted to be detachably seated in the channel 2 of the annulus 1 and this clamping ring comprises a pair of complemental sections 4—4 which have their opposite ends coupled together through the medium of the outwardly extending resilient loops 5—5. The loops 5—5 include a diagonally extending portion 6—6 as clearly seen in Figure 3 of the drawings.

In the use of the invention, the hose to be darned is designated by the reference character A and is positioned through the annulus 1 in such a manner that the hole B therein is disposed within said annulus. The clamping ring 3 is then inserted in the hose in a manner to clamp the portion surrounding said opening B in the V-shaped channel 2 of the annulus under tension. As best illustrated in Figure 2 of the drawings, the outwardly extending loop 5 prevents the portion of the hose on the upper side of the device from obstructing the opening or hole B therein and interfering with the darning operation. By compressing the opposite sides of the loops 5 the complemental section 4—4 of the clamping ring are drawn together and the device may be thus expeditiously inserted in or moved from the annulus 1. By providing a substantially V-shaped channel in the annulus, the hose will be securely clamped therein against the opposite walls of the channel by the sections 4 which are of circular cross section.

It is believed that the many advantages of a device constructed in accordance with this invention will be readily understood, and although the preferred embodiment of the invention is as illustrated and described, it is to be understood that changes in the details of construction may be had which will fall within the scope of the invention as claimed.

What is claimed is:—

A hose darning clamping ring comprising a rigid metallic annulus having a circumferentially extending channel of substantially V-shaped formation in its inner periphery for the reception of the hose and a resilient clamping ring of circular cross section adapted to seat in the channel in a manner to frictionally bind the hose therein, said clamping ring comprising a pair of complemental sections having spaced opposed ends and a pair of resilient loops having their opposite ends integrally connected to the opposed ends of the sections for resiliently connecting said sections together in spaced relation, said loops extending inwardly, then downwardly and outwardly and then upwardly and outwardly from the sections and constituting guards for retaining adjacent portions of the hose outwardly of the annulus.

In testimony whereof I affix my signature.

GRACE E. GIBBONEY.